United States Patent
Kameda et al.

(10) Patent No.: US 10,173,257 B2
(45) Date of Patent: Jan. 8, 2019

(54) METHOD OF MACHINING SCREW

(71) Applicant: NITTAN VALVE CO., LTD., Kanagawa (JP)

(72) Inventors: Michihiro Kameda, Kanagawa (JP); Masaaki Inoue, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 15/501,368

(22) PCT Filed: Jan. 28, 2016

(86) PCT No.: PCT/JP2016/052430
§ 371 (c)(1),
(2) Date: Feb. 2, 2017

(87) PCT Pub. No.: WO2014/130340
PCT Pub. Date: Aug. 3, 2014

(65) Prior Publication Data
US 2018/0050383 A1    Feb. 22, 2018

(51) Int. Cl.
*B23G 5/06* (2006.01)
*B21H 3/08* (2006.01)
(Continued)

(52) U.S. Cl.
CPC .............. *B21H 3/08* (2013.01); *B21H 3/02* (2013.01); *B21H 3/10* (2013.01); *B23G 1/02* (2013.01);
(Continued)

(58) Field of Classification Search
CPC ... B23G 1/16; B23G 1/50; B23G 5/06; B23G 7/00; B23G 7/02; B23G 2200/146;
(Continued)

(56) References Cited

U.S. PATENT DOCUMENTS 2,816,302 A * 12/1957 Bauer .................... B23G 5/06
                                                                    408/220
5,700,120 A * 12/1997 Manning ............... F16B 31/06
                                                                    411/389
(Continued)

FOREIGN PATENT DOCUMENTS

JP    03-033024 U1    4/1991
JP    2001-9637 A     1/2001
(Continued)

OTHER PUBLICATIONS

Written Opinion of the International Searching Authority dated Mar. 22, 2016 in the corresponding application PCT/JP2016/052430.

*Primary Examiner* — Edward Tolan
(74) *Attorney, Agent, or Firm* — Roberts Mlotkowski Safran Cole & Calderon, P.C.

(57) ABSTRACT

A method of machining a screw is provided that is capable of preventing formation of a protruding section at a thread tip section. A thread is formed by cutting on a cylindrical body, and a surface of the thread is plastically deformed by rolling. Because of the cutting, a width between-side surfaces of a thread tip section is in a narrowed state as compared to a normal width. This width is narrowed toward a tip of the thread while a thread body section has a width expanded as compared to a normal width. Consequently, the side surfaces are formed to bulge by an excess thickness portion as compared to normal side surfaces. The rolling plastically deforms both side surfaces to cause the excess thickness portion to plastically flow toward the side surfaces.

7 Claims, 4 Drawing Sheets

(51) Int. Cl.
*B21H 3/10* (2006.01)
*B21H 3/02* (2006.01)
*B23G 1/02* (2006.01)
*B23G 9/00* (2006.01)
*C21D 9/00* (2006.01)

(52) U.S. Cl.
CPC .............. *B23G 5/06* (2013.01); *B23G 9/001* (2013.01); *C21D 9/0093* (2013.01)

(58) Field of Classification Search
CPC .. B23G 2210/04; B23G 2210/16; B23G 1/02; B23G 9/001; B21H 3/02; B21H 3/08; B21H 3/10
See application file for complete search history.

(56) References Cited

U.S. PATENT DOCUMENTS

| | | | |
|---|---|---|---|
| 6,499,920 B2* | 12/2002 | Sawabe | B23G 5/005 408/222 |
| 6,918,718 B2* | 7/2005 | Schwarz | B23G 5/06 408/220 |
| 7,354,350 B2* | 4/2008 | Hechtle | B23G 7/02 470/204 |
| 7,467,577 B2* | 12/2008 | Glimpel | B23G 5/06 82/1.11 |
| 7,625,292 B2* | 12/2009 | Glimpel | B23G 5/06 470/199 |
| 2004/0258492 A1* | 12/2004 | Hakansson | B23G 7/02 408/222 |
| 2005/0217345 A1 | 10/2005 | Taniguchi et al. | |
| 2007/0293329 A1* | 12/2007 | Glimpel | B23G 1/16 470/10 |
| 2008/0075550 A1* | 3/2008 | Reed | B23G 5/06 408/230 |

FOREIGN PATENT DOCUMENTS

JP 2005-288456 A 10/2005
JP 2010-162576 A 7/2010

* cited by examiner

METHOD OF MACHINING SCREW

CROSS-REFERENCE TO RELATED APPLICATIONS

The present application is a U.S. National Phase of PCT/JP2016/052430 filed on Jan. 28, 2016. The disclosure of the PCT Application is hereby incorporated by reference into the present Application.

TECHNICAL FIELD

The present invention relates to a method of machining a screw.

BACKGROUND ART

As described in Patent Document 1, methods of machining screws include a method of forming a thread on a work material by cutting and subsequently plastically deforming a surface of the thread by rolling. Specifically, when a screw is formed on an inner circumferential surface of a cylindrical body used as a work material, a cutting tap is used for forming a female screw on the inner circumferential surface of the cylindrical body and a rolling tap is then used for plastically deforming a surface of a thread of the female screw so as to form a female screw with an effective diameter.

A screw formed by using this method of machining a screw has a thread surface work-hardened so that a predetermined strength can be achieved.

PRIOR ART DOCUMENT

Patent Document

Patent Document 1: Japanese Laid-Open Patent Publication No. 2010-162576

SUMMARY OF THE INVENTION

Problem to be Solved by the Invention

However, since the method of machining a screw includes substantially entirely pressing both left and right side surfaces of a thread at the time of rolling, a portion of a work material is pushed up from both the left and right side surfaces of the thread toward the outside of a tip section of the thread and, therefore, protruding sections are respectively formed on both the left and right sides to project at the tip section of the thread, resulting in a structure with a cavity (recess) formed between both the left and right protruding sections (see FIG. 2 of Patent Document 1). Thus, the tip section structure of the thread has a risk of breakage of the protruding sections and, if the protruding sections are broken, the broken protruding sections may cause a malfunction of an apparatus or a device using the screw.

The present invention was conceived in view of the situations and it is therefore an object of the present invention to provide a method of machining a screw capable of preventing formation of a protruding section at a tip section of a thread.

Means for Solving Problem

To achieve the object, the present invention provides configurations of (1) to (7). In particular, the present invention provides (1) a method of machining a screw including forming a thread on a work material by cutting and subsequently plastically deforming a surface of the thread by rolling, wherein because of the cutting, a width between both side surfaces of a tip section of the thread is in a narrowed state as compared to a width between both normal side surfaces of the thread tip section and is gradually narrowed toward a tip of the thread while a body section closer to a base end as compared to the tip section of the thread has a width between both side surfaces of the thread body section expanded as compared to a width between both normal side surfaces of the thread body section so that each of the side surfaces of the thread body section is formed to bulge by an excess thickness portion as compared to the normal side surfaces of the thread body section, and wherein the rolling plastically deforms the both side surfaces of the thread body section to cause the excess thickness portion to plastically flow toward each of the side surfaces of the thread tip section.

According to this configuration, because of the rolling, the width between the both side surfaces of the thread body section is turned into the normal width between the both side surfaces while the excess thickness portions bulging from the normal body side surfaces are pushed up due to the plastic flow based on the rolling and guided to the both side surfaces of the thread tip section to overlap on the both side surfaces of the tip section, so that the both side surfaces of the thread tip section bulge to the width between the both normal side surfaces of the tip section. Additionally, since the plastic flow is in relation of being guided to the both side surfaces of the thread tip section, a portion (plastically deformed portion) of a plastic deformation layer based on the plastic flow is prevented from protruding from the thread tip section on the both sides in a width direction toward the outside of the thread tip section, and a basic shape of the thread tip section is maintained. This can prevent protruding sections from being formed with a cavity interposed therebetween at the thread tip section based on the plastic flow of the excess thickness portions.

Obviously, in this case, the cutting performed before the rolling can reduce the machining resistance of the rolling so that the rolling can easily be performed. This enables manufacturing of a screw structure with thread surface roughness and lead accuracy sufficiently increased based on the rolling.

(2) In the configuration of (1), the cutting forms the thread tip section into a shape tapered toward a tip thereof.

According to this configuration, the excess thickness portions plastically flow along the tip side surfaces of the tapered thread onto the elongated tip side surfaces, and the excess thickness portions can be disposed as the plastically deformed portion overlapping on the both side surfaces having the tapered thread shape. Therefore, the basic shape of the tapered thread can be maintained and the protruding sections can more reliably be prevented from being formed at the thread tip section on the both sides in a width direction.

(3) In the configuration of (1), the cutting forms an underfill space between each of the side surfaces of the thread tip section and each of the normal side surfaces of the thread tip section and an excess thickness portion between each of the side surfaces of the thread body section and each of the normal side surfaces of the thread body section such that the underfill space and the excess thickness portion have volumes close to each other.

According to this configuration, the excess thickness portions of the body side surfaces can be allowed to plastically flow to the underfill spaces so as to turn the side surfaces of the thread tip section into the normal side surfaces of the thread tip section, and the thread can accurately be formed into the normal thread shape.

(4) In the configuration of (1), the work material is a cylindrical body, the cutting is performed by using a cutting tap on an inner circumferential surface of the cylindrical body to form a female screw on the cylindrical body inner circumferential surface, and the rolling is performed by using a rolling tap on body side surfaces of a thread of the female screw.

According to this configuration, even when the rolling is performed by using a rolling tap, a female screw can specifically be formed while preventing the formation of the protruding sections at the thread tip section.

(5) In the configuration of (1), the work material is a shaft body, the cutting is performed by using a threading die on an outer circumferential surface of the shaft body to form a male screw on the shaft body outer circumferential surface, and the rolling is performed by using a rolling die on body side surfaces of a thread of the male screw.

According to this configuration, even when a male screw is machined by rolling on the shaft body outer circumferential surface, the same effect as (4) can be produced.

(6) In the configuration of (1), a multiple start screw is formed by the cutting on the work material, and wherein the rolling is performed on threads of the multiple start screw.

According to this configuration, even when a multiple start screw with a long lead is formed, the cutting before the rolling can reduce the machining resistance of the rolling so that the rolling can be used for forming the multiple start screw. Therefore, the characteristics of the rolling can effectively be utilized to easily manufacture a multiple start screw with surface roughness and lead accuracy sufficiently increased.

(7) In the configuration of (1), the rolling is followed by a heat treatment to increase surface hardness of a thread as compared to a state before the heat treatment.

According to this configuration, the hardness inside the thread can be maintained at material hardness to ensure toughness, and the surface of the thread can be improved in hardness (surface hardness) while maintaining the surface roughness and the lead accuracy increased by the rolling, so that an optimum thread for a screw can be provided.

Effect of the Invention

The present invention can provide the method of machining a screw capable of suppressing the formation of the protruding sections at the thread tip section even when rolling is used.

MODE FOR CARRYING OUT THE INVENTION

An embodiment of the present invention will now be described with reference to the drawings.

Figure 1:
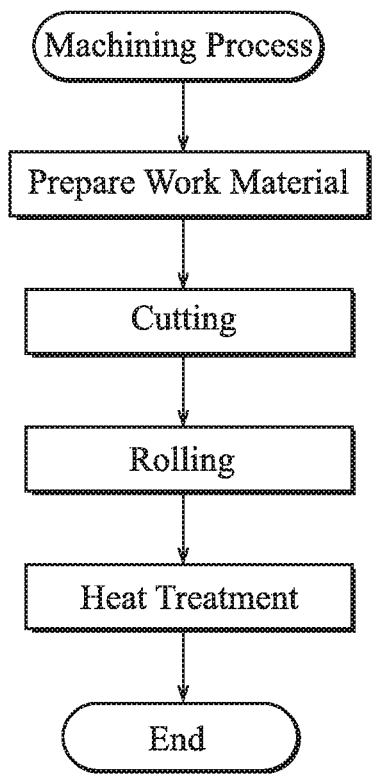
FIG. 1 is a flowchart of a machining process according to an embodiment.

In this embodiment, a method of machining a screw according to the present invention is described by taking as an example the case of forming a female screw on an inner circumferential surface of a cylindrical body used as a work material, and FIG. 1 shows a machining process thereof. The method will hereinafter specifically be described in accordance with the machining process shown in FIG. 1.

1. First, as shown in FIG. 1, a cylindrical body 1 (see FIG. 2) is prepared as a work material in advance.

This is because a predetermined female screw 2 is formed on an inner circumferential surface 1a of the cylindrical body 1.

The cylindrical body 1 is made of a structural steel, and the structural steel is, for example, JIS SCM415 to 420 (chromium molybdenum steel). This is because a heat treatment described later is made effective.

Figure 2:
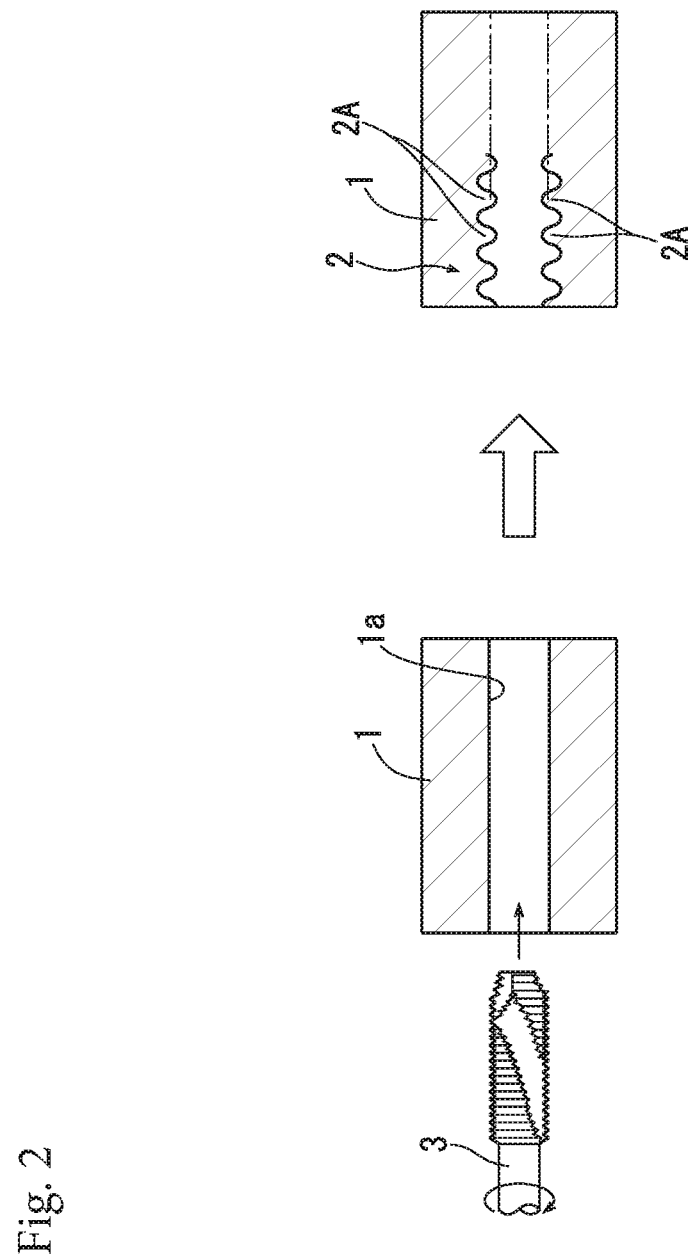
FIG. 2 is an explanatory view for explaining cutting on a cylindrical body inner circumferential surface.

2. As shown in FIGS. 1 and 2, the female screw (base screw) 2 is formed by cutting on the inner circumferential surface 1a of the cylindrical body 1.

This is because the cutting of the female screw 2 having a predetermined thread shape (base thread shape) is performed as a preceding process for rolling described later so as to reduce the burden of the rolling.

(1) The female screw 2 is formed as a multiple start screw in this embodiment. This is because the multiple start screw operationally works preferably in a feed screw mechanism in a mechanical lash adjuster etc.

(2) A cutting tap 3 is used for the cutting of the female screw 2 on the inner circumferential surface 1a of the cylindrical body 1. This is because the cutting of the female screw 2 on the inner circumferential surface 1a of the cylindrical body 1 can readily and easily be performed. The cutting tap 3 is obviously a tool used for cutting threads on the inner circumferential surface 1a of the cylindrical body 1, and the female screw 2 is formed on the inner circumferential surface 1a of the cylindrical body 1 by causing the cutting tap 3 to rotate and cut into the inner circumferential surface 1a of the cylindrical body 1.

Figure 4:
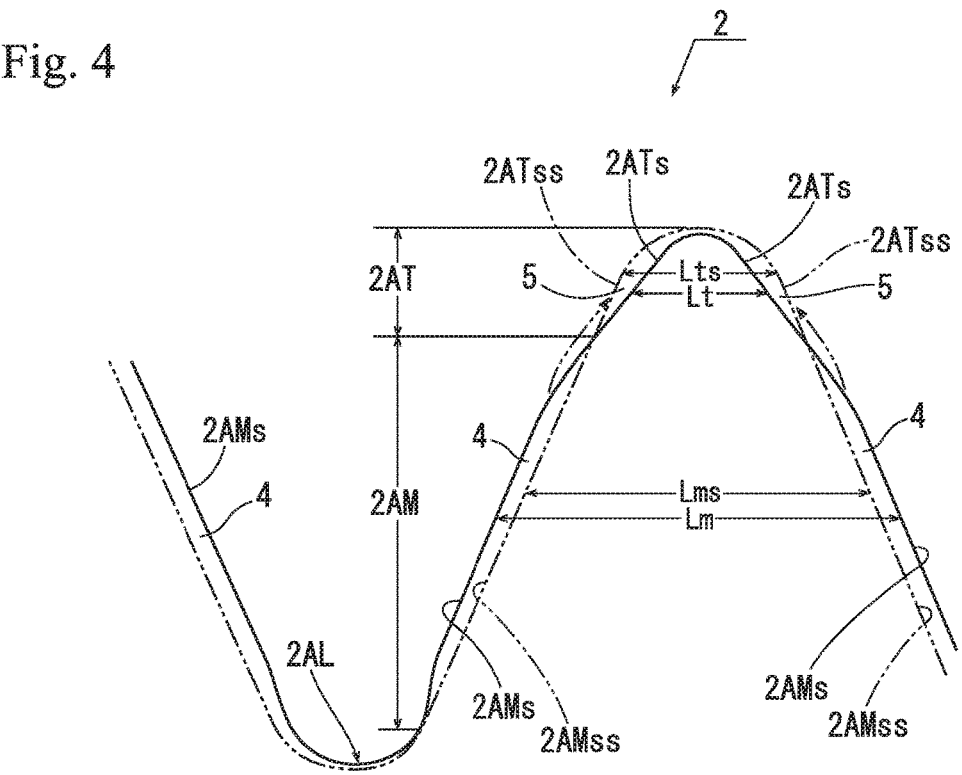
FIG. 4 is an explanatory view for explaining a thread formed by cutting in comparison with a normal thread.

(3) By using the cutting tap 3, a predetermined thread shape (base thread shape) of the female screw 2 is formed such that each of threads 2A of the female screw 2 has a base end section 2AL machined into a shape close to a root shape defined as a finished shape thereof while a tip section 2AT and a body section 2AM between the tip section 2AT and the base end section 2AL are machined as indicted by a solid line of FIG. 4.

(3-1) As shown in FIG. 4, the body section 2AM of the thread 2A has a shape with a width Lm between both side surfaces (portions of flanks) 2AMs of the body section 2AM gradually narrowing from the base end side toward the tip side (from the lower side toward the upper side of FIG. 4), and the width Lm between the both side surfaces 2AMs of the thread body section 2AM is expanded at any position as compared to a normal width Lms (a setting value at a corresponding position) between both normal side surfaces (shown as an imaginary line) of the thread body section 2AM so that each of the both side surfaces 2AMs of the thread body section 2AM bulges by an excess thickness portion 4 as compared to normal side surfaces 2AMss of the thread body section 2AM. This is because the excess thickness portion 4 of the thread body section 2AM is plastically deformed (caused to plastically flow) by rolling in the subsequent process so as to achieve sufficiently high surface roughness and lead accuracy of the thread 2A.

In this case, the excess thickness portion 4 with a thickness of about 50 μm is formed in this embodiment, and the volume of the excess thickness portion 4 is comparatively small.

(3-2) As shown in FIG. 4, in the tip section 2AT of the thread 2A, a width Lt between both side surfaces 2ATs of the tip section 2AT is in a narrowed state at any position as compared to a width Lts between both normal side surfaces 2ATss of the tip section 2AT of the thread 2A and is gradually narrowed toward the tip of the thread 2A (into a shape tapered toward the tip). This is because, to accept the plastic flow of the excess thickness portion 4 based on the rolling described later, each of the side surfaces 2ATs of the thread tip section 2AT is formed to have an underfill space 5 recessed as compared to the normal side surfaces 2ATss of the thread tip section 2AT. Therefore, in this embodiment, the underfill space 5 and the excess thickness portion 4 have volumes set to values close to each other.

In this case, the underfill spaces 5 are formed only on the side surfaces 2ATs of the thread tip section 2AT so that the plastic flow of the excess thickness portions 4 is accurately guided to the side surfaces 2ATs at the time of rolling to prevent the shape of the thread 2A from being formed as a different shape and so that the plastic flow of the excess thickness portions 4 is kept within the side surfaces 2ATs of the thread tip section 2AT to prevent a portion of a plastically deformed layer from projecting as a protruding section (burr) from the thread tip section 2AT on the both sides in a width direction (left-right direction of FIG. 4) toward the outside of the tip section 2AT.

Figure 3:
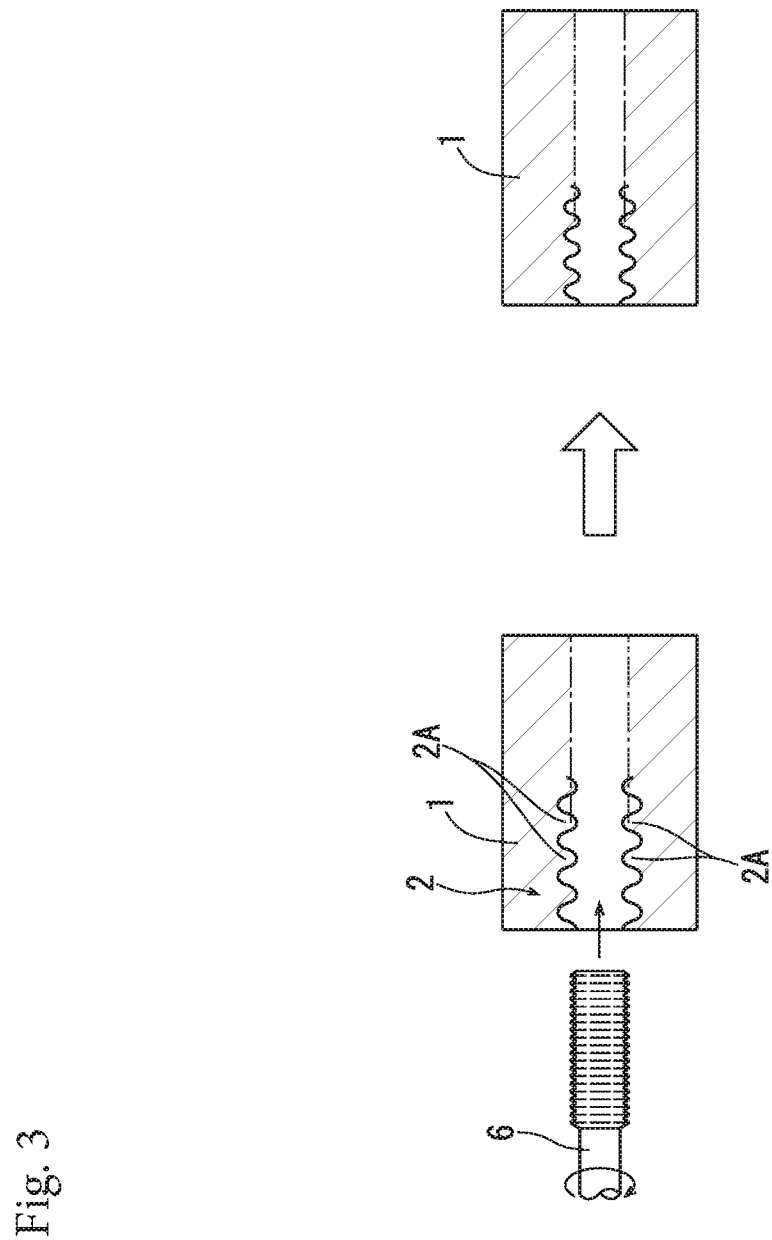
FIG. 3 is an explanatory view for explaining rolling on a female screw formed by the cutting on the cylindrical body inner circumferential surface.

3. As shown in FIGS. 1 and 3, the rolling is performed on the threads 2A of the female screw 2.

This is because the thread surfaces (the side surfaces 2AMs, 2ATs) of the threads 2A are remarkably improved in the surface roughness and the lead accuracy as compared to the screw machining by the cutting tap 3. As a result, when this screw structure is used in a feed screw mechanism in a mechanical lash adjuster (body) etc., a running-in operation can be suppressed to a requisite minimum.

(1) A rolling tap 6 is used for the rolling on the threads 2A.

Particularly when a multiple start screw having two or more starts (a screw with a long lead) is machined, it is normally difficult to machine the screw by simply using the rolling tap 6 because of a large machining resistance. However, since the predetermined thread shape (the base thread shape) described above is formed by the cutting tap 3 in the preceding process of the rolling so as to reduce the machining resistance due to the rolling tap 6 in this embodiment, the rolling tap 6 can be used.

Obviously, the rolling tap 6 is basically a tool forming the threads 2A by plastically deforming a work material and is characterized by the absence of generation of a chip when used.

(2) The rolling tap 6 plastically deforms the both side surfaces 2AMs of the thread body section 2AM and causes each of the excess thickness portions 4 of the thread body section 2AM to plastically flow toward the underfill space 5 on each of the side surfaces 2ATs of the thread tip section 2AT as indicated by an arrow (imaginary line) of FIG. 4. This is because the rolling forms a final thread shape without destroying a thread shape and makes the surface roughness and the lead accuracy sufficiently high on the side surfaces 2AMs, 2ATs of the threads 2A. This is also because the machining burden of the rolling is reduced by performing the rolling mainly on the excess thickness portions 4 of the thread body section 2AM so as to enable the rolling by the rolling tap 6.

In this case, since the plastic flow of the excess thickness portions 4 moves over the comparatively long side surfaces 2ATs of the thread tip section 2AT to the tip thereof and the volumes of the excess thickness portions 4 are comparatively small, the plastic flow is certainly kept on the side surfaces 2ATs of the thread tip section 2AT and is prevented from advancing from the thread tip section 2AT on the both sides in a width direction (left-right direction of FIG. 4) toward the outside of the tip section 2AT.

4. Subsequently, as shown in FIG. 1, the cylindrical body 1 after the rolling is subjected to a heat treatment to increase surface hardness of the threads 2A of the female screw 2.

This is because the internal hardness of the threads is maintained at material hardness to ensure toughness while the surface roughness and the lead accuracy increased by the rolling are maintained under the state of high surface hardness.

For the heat treatment, carburizing is performed in this embodiment, and quenching and tempering are performed with carbon allowed to infiltrate only in the vicinity of the surfaces of the threads 2A of the female screw 2. Therefore, the threads 2A made of the material (JIS 415 to 420) described above are maintained in an original state of a small carbon content inside the threads, and the internal hardness is not increased even when the quenching is performed. On the other hand, since a carbon content is increased in surface layers of the threads, the surface layers are made extremely hard by the quenching.

Figure 5:
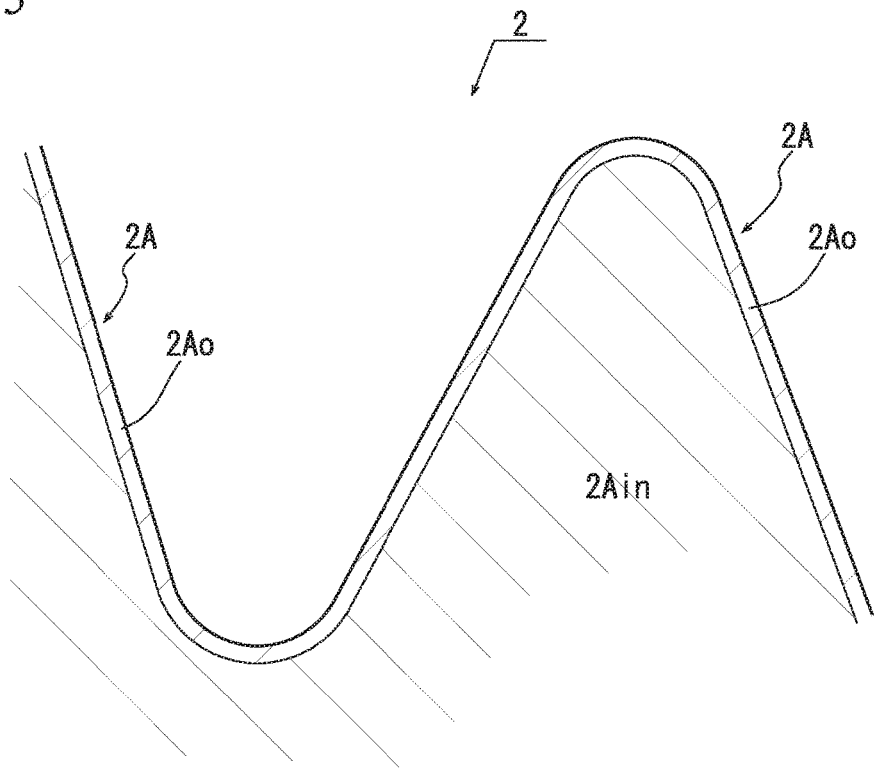
FIG. 5 is an explanatory view for simply explaining an internal structure of a thread according to an embodiment.

5. Therefore, the cylindrical body 1 (each of the threads 2A) machined through the machining process has a hardened layer 2Ao in the surface layer of the thread 2A as shown in FIG. 5, and the hardened layer is not formed on an inner side 2Ain than the hardened layer 2Ao so that the toughness is ensured. Additionally, the surfaces of the threads 2A of the female screw 2 have the sufficiently improved surface roughness and lead accuracy reflecting the use of the rolling.

Thus, when the cylindrical body 1 is used in a feed screw mechanism, for example, as a cylindrical body in a mechanical lash adjuster (see WO2013/136508 A1), the cylindrical body 1 acts as an optimal component of the feed screw mechanism.

Additionally, since the plastic flow of the excess thickness portions 4 is kept on the side surfaces 2ATs of the thread tip section 2AT having a tapered shape during the rolling and is prevented from advancing from the thread tip section 2AT on the both sides in a width direction toward the outside of the tip section 2AT, the final thread shape can be formed without destroying the thread shape and, moreover, this can prevent the protruding sections (burrs) from projecting from each of the thread tip sections 2AT on the both sides in a width direction and resulting in formation of a structure with a cavity formed between the both protruding sections (see FIG. 2 of Patent Document 1). Thus, if the cylindrical body 1 is used as a body of a feed screw mechanism of a mechanical lash adjuster, no protruding section is broken and causes a malfunction of the feed screw mechanism.

The present invention described above in terms of the embodiment includes the following forms.

(1) The method of machining a screw according to the embodiment may be used for forming a male screw. For example, the method of machining a screw can be used if a male screw (each of the threads 2A) is formed on a plunger (shaft body) outer circumferential surface making up the feed screw mechanism along with the body in the mechanical lash adjuster. Specifically, the cutting of the embodiment is performed by using a threading die on the outer circumferential surface of the plunger that is a shaft body so as to form a male screw on the plunger outer circumferential surface, and the rolling of the embodiment is performed by using a rolling die on the side surfaces 2AMs of the thread body sections 2AM of the male screw.

(2) The method of machining a screw according to the embodiment may be applied not only to the case of forming a multiple start screw but also to the case of forming a usual screw (single start screw).

(3) The heat treatment may not be performed in the method of machining a screw according to the embodiment.

EXPLANATIONS OF LETTERS OR NUMERALS 1 cylindrical body (work material)
2 female screw
2A thread
2AT thread tip section
2ATs side surface of a thread tip section
2ATss normal side surface of a thread tip section
3 cutting tap
4 excess thickness portion
5 underfill space
6 rolling tap
Lt width between both side surfaces of a thread tip section
Lts normal width between both side surfaces of a thread tip section
2AM thread body section
2AMs side surface of a thread body section
2SMss normal side surface of a thread body section
Lm width between both side surfaces of a thread body section
Lms normal width between both side surfaces of a thread body section

The invention claimed is:

1. A method of machining a screw including forming a thread on a work material by cutting and subsequently plastically deforming a surface of the thread by rolling,
   wherein because of the cutting, a width between both side surfaces of a tip section of the thread is in a narrowed state as compared to a width between both normal side surfaces of the thread tip section and is gradually narrowed toward a tip of the thread while a body section closer to a base end as compared to the tip section of the thread has a width between both side surfaces of the thread body section expanded as compared to a width between both normal side surfaces of the thread body section so that each of the side surfaces of the thread body section is formed to bulge by an excess thickness portion as compared to the normal side surfaces of the thread body section, and
   wherein the rolling plastically deforms the both side surfaces of the thread body section to cause the excess thickness portion to plastically flow on the both side surfaces of the thread tip section such that the width of the tip section increases to normal and the thickness of the thread body section decreases to normal.

2. The method of machining a screw according to claim 1, wherein the cutting forms the thread tip section into a shape tapered toward a tip thereof.

3. The method of machining a screw according to claim 1, wherein the cutting forms an underfill space between each of the side surfaces of the thread tip section and each of the normal side surfaces of the thread tip section and an excess thickness portion between each of the side surfaces of the thread body section and each of the normal side surfaces of the thread body section such that the underfill space and the excess thickness portion have volumes close to each other.

4. The method of machining a screw according to claim 1,
   wherein the work material is a cylindrical body,
   wherein the cutting is performed by using a cutting tap on an inner circumferential surface of the cylindrical body to form a female screw on the cylindrical body inner circumferential surface, and
   wherein the rolling is performed by using a rolling tap on body side surfaces of a thread of the female screw.

5. The method of machining a screw according to claim 1,
   wherein the work material is a shaft body,
   wherein the cutting is performed by using a threading die on an outer circumferential surface of the shaft body to form a male screw on the shaft body outer circumferential surface, and
   wherein the rolling is performed by using a rolling die on body side surfaces of a thread of the male screw.

6. The method of machining a screw according to claim 1,
   wherein a multiple start screw is formed by the cutting on the work material, and
   wherein the rolling is performed on threads of the multiple start screw.

7. The method of machining a screw according to claim 1, wherein the rolling is followed by a heat treatment to increase surface hardness of a thread as compared to a state before the heat treatment.

* * * * *